April 25, 1939.  J. W. SLOAN  2,156,033
REVERSE CLUTCH MECHANISM
Filed Oct. 8, 1937  3 Sheets-Sheet 1

Inventor
J. W. Sloan
By Barry & Cyr
Attorneys

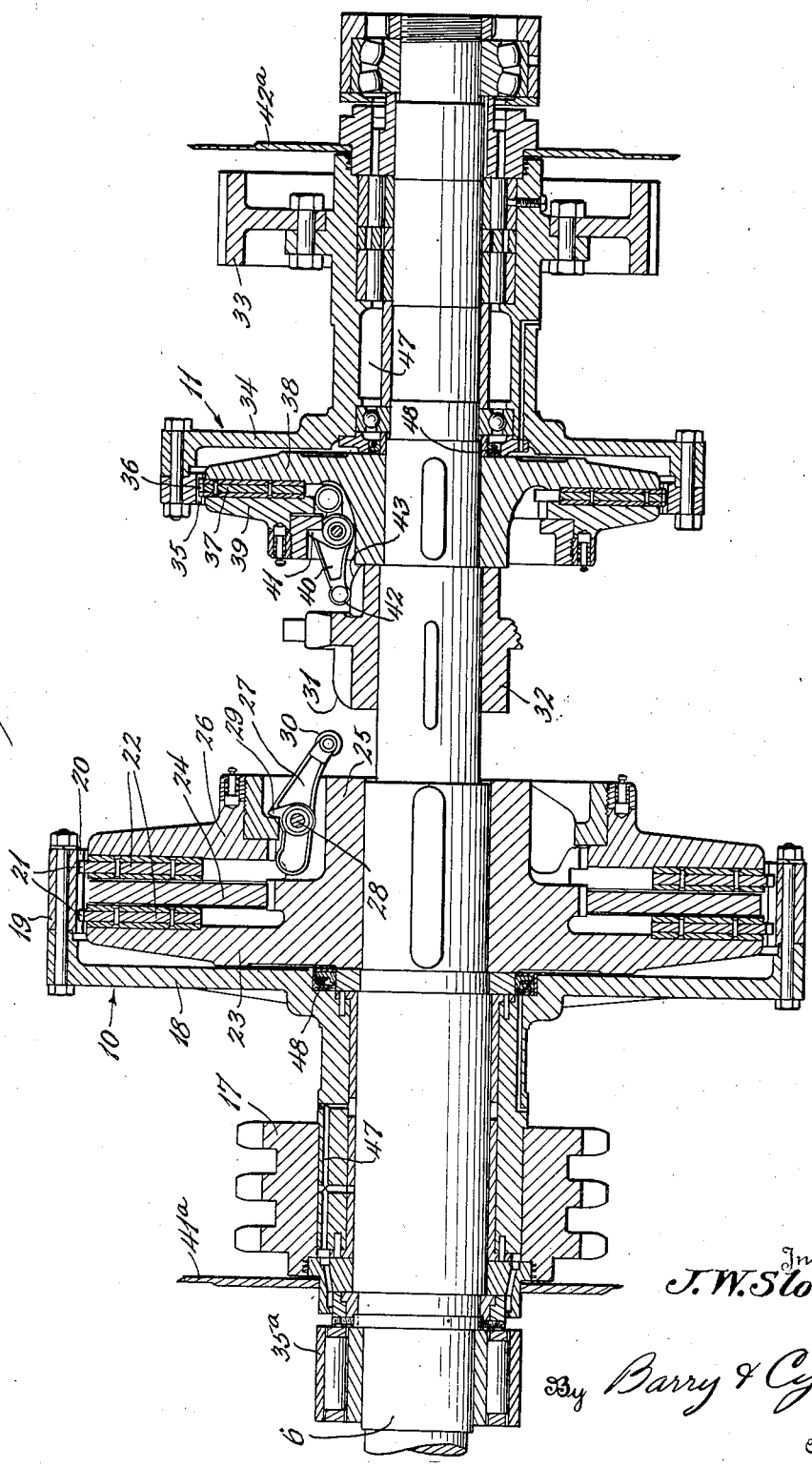

April 25, 1939.  J. W. SLOAN  2,156,033
REVERSE CLUTCH MECHANISM
Filed Oct. 8, 1937   3 Sheets-Sheet 3
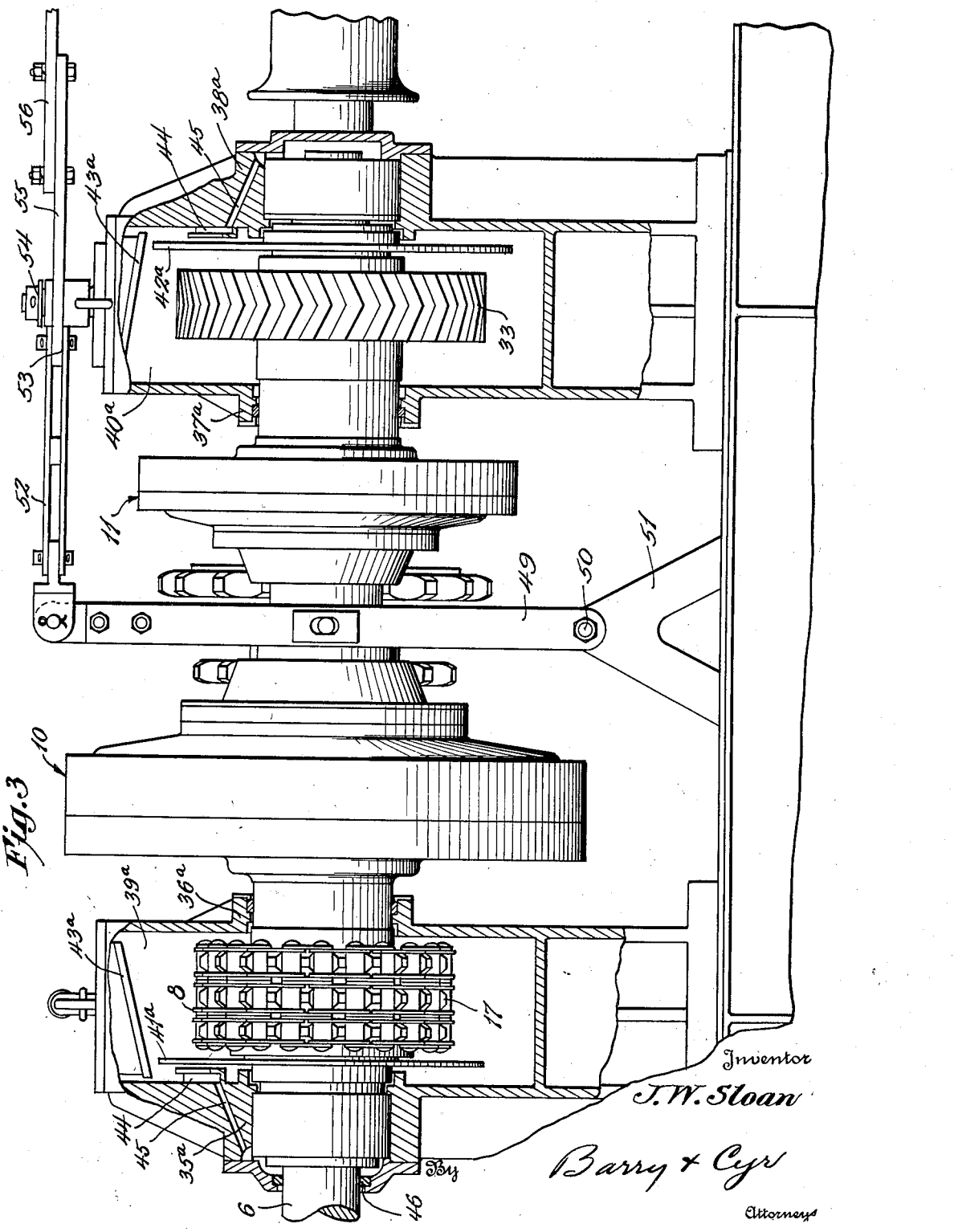
Inventor
J. W. Sloan
By Barry & Cyr
Attorneys Patented Apr. 25, 1939

2,156,033

UNITED STATES PATENT OFFICE 2,156,033

REVERSE CLUTCH MECHANISM

James W. Sloan, Tulsa, Okla., assignor to International Supply Company, Tulsa, Okla., a corporation of Delaware Application October 8, 1937, Serial No. 168,089

2 Claims. (Cl. 192—21)

This invention relates to improvements in reverse clutch mechanism and more particularly to mechanism of this character adapted especially for use with drill rigs. A conventional drilling rig comprises a mud pump, draw-works and a rotary table, which are driven by one or more internal combustion engines through suitable transmission mechanism. My invention pertains to the provision of an improved clutch mechanism between the prime mover and the draw-works.

Reverse clutch mechanism have been provided heretofore between the prime mover and the draw-works of drilling rigs, but such devices have been extremely expensive to manufacture, consist of a large number of parts, and are not only difficult to operate but are subjected to severe strains and stresses with a consequent necessity of frequent replacements. The present invention was conceived for the purpose of eliminating these disadvantages and increasing the efficiency of operation of the reverse clutch mechanism heretofore employed, while at the same time providing fewer parts and reducing the cost of such mechanism.

Another object of my invention is to provide improved means for lubricating the mechanism whereby the parts may operate over long periods without liability of deterioration due to friction or wear.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 2 is a horizontal sectional view of portions of the reverse clutch mechanism.

Fig. 3 is a side elevation partly broken away and partly in vertical section of said mechanism.

Figure 1:
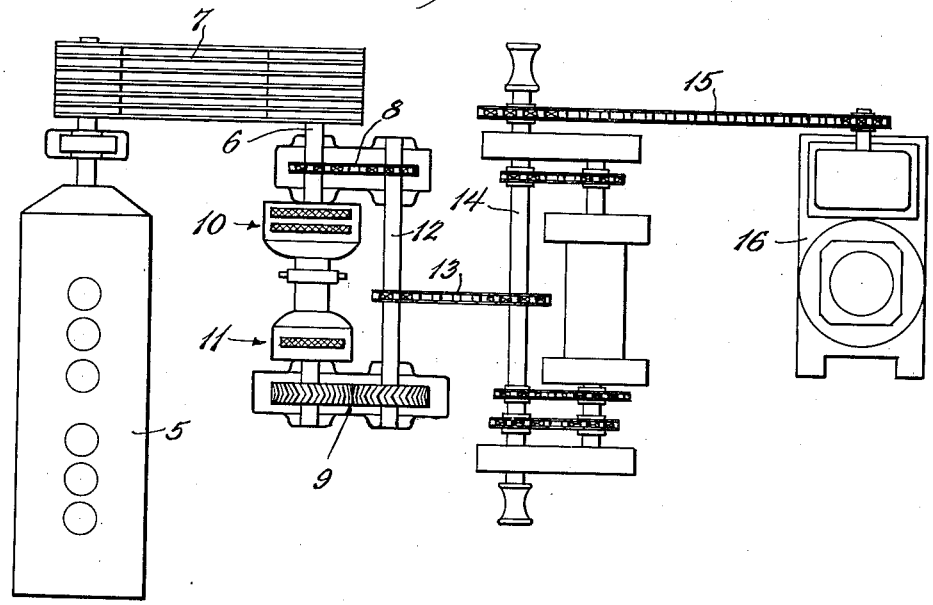
Fig. 1 is a diagrammatic view of a conventional drilling rig with my improved reversing clutch mechanism interposed therein.

Referring to Fig. 1, 5 designates a suitable prime mover, such as an internal combustion engine, which transmits movement to the shaft 6 of the reverse clutch mechanism, by any suitable means, such as a belt or sprocket chain 7. The shaft 6 by means of a sprocket chain 8 and gears 9 controlled by clutches 10 and 11 respectively, drives a shaft 12 in reversible directions. A sprocket chain or the like 13 actuated by the shaft 12 transmits movement to the driving shaft 14 of a conventional draw-works, and a chain or the like 15 imparts movement from the draw-works to a conventional rotary 16.

Figure 4:
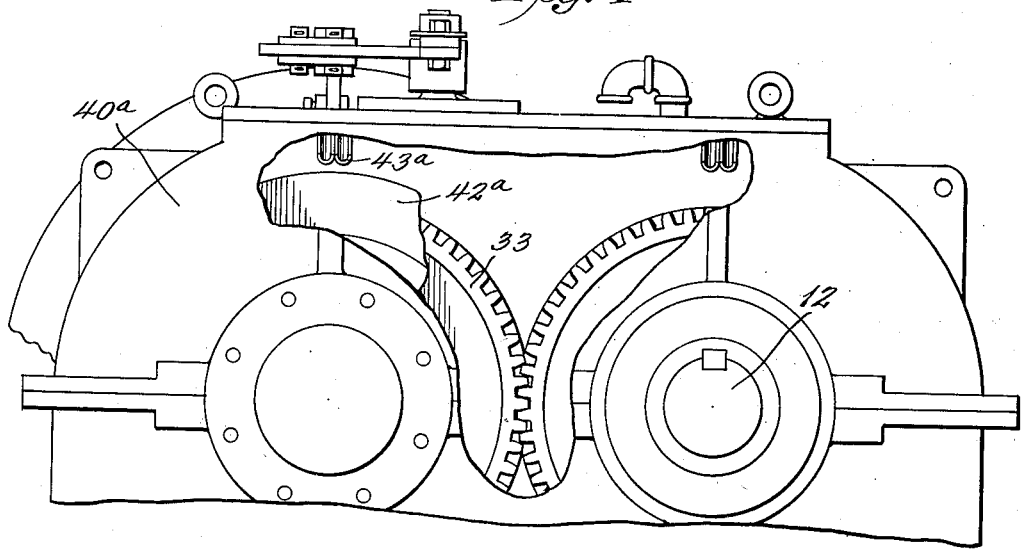
Fig. 4 is an end elevation of the mechanism partly broken away to illustrate internal features.

My invention resides specifically in the improved reverse clutch mechanism illustrated in Figs. 2, 3 and 4.

Referring now to these figures and especially to Fig. 2, it will be noted that a sprocket wheel 17 is loosely mounted or floats on the driving shaft 6 of the reverse clutch mechanism, and such sprocket wheel is rigidly united with a disc 18 having an annular peripheral flange 19 provided with internal gear teeth 20. Such teeth mesh with the external teeth 21 of friction rings 22; the parts 18 to 22 inclusive, forming part of a double disc clutch that is of great strength and high capacity for the purpose of driving the draw-works and the rotary in the forward direction.

A disc 23 that is connected to the shaft 6 co-operates with one of the friction discs 22. An annular spacing plate 24 is placed between the friction rings and slides axially on the hub 25 of the disc 23. Another or outer annular plate 26 which is movable toward the disc 23 functions to squeeze or clamp the friction disc 22 between the parts 23, 24 and 26 so that the teeth 21 will co-operate with the teeth 20 to effect forward movement of the sprocket wheel 17.

For the purpose of moving the plate 26 toward the disc 23, the clutch includes one or more rocking arms 27 that are pivotally mounted at 28 on the hub of the clutch and have projecting lugs 29 that engage the hub of the plate 26. The outer ends of the levers are preferably provided with anti-friction rollers 30 adapted to ride on cam surfaces 31 of a collar 32 that is keyed to the shaft 6 for rotation therewith, but may slide axially of the shaft to bring the cam surfaces into engagement with the wheels 30, and this will result in throwing the clutch in.

The sprocket wheel 17 through the instrumentality of the chain 8 drives the shaft 12 and consequently when the clutch is in, the draw-works and rotary will be driven forwardly with powerful force.

For reversing purposes less power is required in the rotary and draw-works and therefore the driving gear 33 (shown at the right-hand of Fig. 2) of the reverse mechanism is driven by the clutch 11, which is of smaller size and has less strength than the clutch 10. The gear 33 is also loosely mounted on the shaft 6, and it is rigidly connected with a disc 34 that has internal teeth 35 meshing with the external teeth 36 of a single friction disc 37. The disc 37 is arranged between a disc 38 which is rigid with the shaft 6, and an annular plate 39 that is movable toward and away from the disc 38. In this construction rocking levers 40 are pivotally connected to the hub portion of the disc 38 and they have lugs 41 for use in pressing the plate 39 toward the disc 38. Antifriction rollers 42 are adapted to engage cam surfaces 43 on the collar 32 for the purpose of actuating the levers, and when this occurs reverse movement will be imparted to the draw-works and rotary through the instrumentality of the meshing gears 33 and 34 of the gearing 9, which is preferably of herringbone construction, as shown in Fig. 1.

As reversing clutch mechanism for use with draw works and the rotary of a drilling rig transmit tremendous power, they have heretofore been made relatively heavy. In order to decrease weight and facilitate the use of clutches of different sizes, it will be noted that I have made the driving shaft 6 of step formation, that is, it has a series of successively reduced portions decreasing in diameter from one end thereof toward the opposite end, and the disc 18 is mounted on the largest portion; the disc 23 on a smaller portion; the collar 32 on a still smaller portion; and the disc 38 and part 34 on a still smaller portion.

The shaft 6, as best shown in Fig. 3, is mounted in bearings 35a, 36a and 37a, 38a arranged respectively at opposite sides of lubricant chambers 39a and 40a. The sprocket wheel 17 rotates in the chamber 39a, and the gear 33 in the chamber 40a, and as pools of oil are contained in these chambers, such oil will function to lubricate the mechanism. Furthermore, the shaft is provided with lubricating discs 41a and 42a arranged respectively in the chambers 39a and 40a and fixed to the shaft 6, and these discs function to throw the oil into inclined troughs 43a positioned respectively in the upper ends of the oil chambers. As the troughs are inclined outwardly and downwardly away from one another, they serve to convey oil into hoppers 44 preferably forming parts of the outer walls of the oil chambers, and from these hoppers the oil is led by passageways 45 to the shaft 6. In this way the outer bearings of the shaft are lubricated.

Sealing rings 46 at the outer ends of these bearings prevent the oil from passing outwardly along the shaft and therefore force it to flow inwardly. I have therefore provided the hubs of the discs 18 and 34 (see Fig. 2) with ducts 47, so that the oil may flow inwardly between the shaft and the hubs of these discs to prevent friction between shafts and certain hubs when the clutches are not in. Sealing rings 48 prevent the oil from travelling into the clutches.

The collar 32 of the clutching mechanism may be controlled by any suitable means; for example, by a lever 49 which has its lower end pivotally mounted at 50 on a standard 51 of the frame of the mechanism. The upper end of the lever is connected by a link 52 to one arm 53 of a bell crank lever that is pivotally mounted at 54 to swing about a vertical axis arranged at the top of the oil chamber 40a. The other arm 55 of the bell crank can be actuated by a handle 56.

In operation it will be understood that as long as the engine 5 is running, the shaft 6 of the clutch mechanism is rotating in a single direction, consequently if the clutch 10 is in, the draw-works and rotary will be driven in a forward direction through the instrumentality of the sprocket chain 8. On the other hand, if the clutch 11 is in, the draw-works and rotary will be moved in the reverse direction through the medium of the gearing 9. Obviously when the collar 32 is in a neutral position, there will be no movement whatever of the draw-works and rotary.

Referring to the advantages of my improved mechanism, it will be noted that as the auxiliary shaft 12 is driven by sprocket mechanism which is controlled by a relatively large disc clutch, the draw-works and rotary table will be driven in the forward mechanism by relatively powerful flexible means while they will be driven in the opposite direction by a relatively small clutch of less capacity through the instrumentality of relatively rigid gear means. The reason for employing a relatively large powerful clutch for the forward action or operation is that greater horsepower is required at that time to be utilized from the prime mover 5, whereas in the reverse direction, much less horse-power is required, and consequently there is no necessity of having as great frictional contact in the reverse clutch as in the forward operation.

Another feature about my improved mechanism is that the reverse clutch 11 may be used as a brake to stop the forward operation of the draw-works.

Furthermore, in prior structures, the draw-works was driven from the reverse clutch mechanism only through the medium of gearing, which of course, causes a jarring and oftentimes too sudden stopping of the draw-works. With the present invention, the draw-works may be braked down very smoothly as the clutch 11 will function as a brake for this purpose.

From the foregoing, it is believed that the construction, operation and advantages of the invention may be readily understood, and I am aware that changes may be made in the details disclosed without departing from the spirit of the invention as expressed in the claims.

What I claim and desire to secure by Letters Patent is:

1. A reversing clutch mechanism for imparting movement of a prime mover to the draw-works and rotary of a drilling rig comprising a driving shaft adapted to be actuated by the prime mover, said shaft having a series of successively reduced portions decreasing in diameter from one end of the shaft toward the opposite end thereof, a relatively large strong clutch mounted on one of the larger portions of the driving shaft and driven thereby, a driven wheel loosely mounted on a still larger portion of said shaft and driven by said clutch, a second relatively small clutch of less strength than the first mentioned clutch mounted on one of the smaller portions of the shaft and driven by the shaft, and a second driven wheel loosely mounted on one of the smaller portions of the shaft and driven by the smaller clutch, each clutch comprising an outer member loosely mounted on the driving shaft and provided with internal teeth, a friction disc having external teeth meshing with said internal teeth, an internal member rotatable with the driving shaft, an annular plate traveling with the inner member, and means including a sleeve slidable on an intermediate portion of said shaft for moving said plate toward the inner member for clamping the friction disc and causing it to rotate with the inner member.

2. A reversing clutch mechanism for imparting movement of a prime mover to the draw-works and rotary of a drilling rig comprising a driving shaft adapted to be actuated by the prime mover, said shaft having a series of successively reduced portions decreasing in diameter from one end of the shaft toward the opposite end thereof, a relatively large strong clutch mounted on one of the larger portions of the driving shaft and driven thereby, a driven wheel looosely mounted on a still larger portion of said shaft and driven by said clutch, a second relatively small clutch of less strength than the first mentioned clutch mounted on one of the smaller portions of the shaft and driven by the shaft, and a second driven wheel looosely mounted on one of the smaller portions of the shaft and driven by the smaller clutch, each clutch comprising an outer member looosely mounted on the driving shaft and provided with internal teeth, a friction disc having external teeth meshing with said internal teeth, an internal member rotatable with the driving shaft, an annular plate traveling with the inner member, said clutches being arranged side by side and having actuating arms extending toward one another, and a collar slidably mounted on an intermediate portion of the shaft between the clutches and having cams at its opposite sides engageable with said arms.

JAMES W. SLOAN.